(12) United States Patent
Caruso

(10) Patent No.: US 9,464,622 B2
(45) Date of Patent: Oct. 11, 2016

(54) ROTOR BLADE ASSEMBLY HAVING A STIFFENING ROOT INSERT

(71) Applicant: General Electric Company, Schenectady, NY (US)

(72) Inventor: Christopher Daniel Caruso, Greenville, SC (US)

(73) Assignee: General Electric Company, Schenectady, NY (US)

( * ) Notice: Subject to any disclaimer, the term of this patent is extended or adjusted under 35 U.S.C. 154(b) by 699 days.

(21) Appl. No.: 13/906,436

(22) Filed: May 31, 2013

(65) Prior Publication Data

US 2014/0356176 A1 Dec. 4, 2014

(51) Int. Cl.
*F03D 1/06* (2006.01)

(52) U.S. Cl.
CPC ....... *F03D 1/0658* (2013.01); *F05B 2260/301* (2013.01); *Y02E 10/721* (2013.01); *Y10T 29/49336* (2015.01)

(58) Field of Classification Search
CPC ........................ F03D 1/0658; F05B 2260/301
See application file for complete search history.

(56) References Cited

U.S. PATENT DOCUMENTS

| | | | |
|---|---|---|---|
| 4,236,873 A | 12/1980 | Sherman et al. | |
| 4,412,784 A * | 11/1983 | Wackerle | B64C 27/473 416/229 R |
| 4,915,590 A | 4/1990 | Eckland et al. | |
| 5,660,527 A | 8/1997 | Deering et al. | |
| 6,443,701 B1 | 9/2002 | Muhlbauer | |
| 7,163,378 B2 | 1/2007 | Kildegaard | |
| 7,517,194 B2 | 4/2009 | Doorenspleet et al. | |
| 7,530,168 B2 | 5/2009 | Sorensen et al. | |
| 7,891,947 B2 * | 2/2011 | Chen | F03D 1/0675 416/225 |
| 7,966,726 B2 | 6/2011 | Schibsbye | |
| 7,993,103 B2 | 8/2011 | Cairo | |
| 8,025,485 B2 | 9/2011 | Jacobsen | |

(Continued)

FOREIGN PATENT DOCUMENTS

| | | | |
|---|---|---|---|
| EP | 1 956 235 B1 | 10/2010 | |
| EP | 2 283 231 B1 | 3/2012 | |
| EP | 2 453 129 A1 | 5/2012 | |
| ES | 2353325 * | 1/2011 | ........... F03D 1/0658 |
| GB | 2472460 | 2/2011 | |

(Continued)

*Primary Examiner* — Craig Kim
*Assistant Examiner* — Brian O Peters
(74) *Attorney, Agent, or Firm* — Dority & Manning, P.A.

(57) ABSTRACT

A rotor blade assembly for a wind turbine having a rigid root insert is disclosed. The rotor blade assembly includes a blade root section having an end face with a substantially annular cross-section defined by an outer sidewall surface and an inner sidewall surface. The end face is configured to attach the rotor blade assembly to a hub. The rotor blade assembly includes a radial bore hole provided a predetermined spanwise distance from the end face and extending between the sidewall surfaces and a longitudinal bore hole provided between the sidewall surfaces and extending from the end face to the radial bore hole. The rigid root insert is disposed within the longitudinal bore hole and extends from the end face to the radial bore hole. As such, the rigid root insert is configured to increase the stiffness of the blade root section when the rotor blade assembly is attached to the hub with bolts that extend into and through the radial bore hole and the longitudinal bore hole.

20 Claims, 6 Drawing Sheets

(56) References Cited

U.S. PATENT DOCUMENTS

| | | |
|---|---|---|
| 8,066,490 B2 | 11/2011 | Babu et al. |
| 8,105,040 B2 | 1/2012 | Vronsky et al. |
| 8,186,960 B2 | 5/2012 | Dawson et al. |
| 2008/0206059 A1 | 8/2008 | Hancock et al. |
| 2010/0038192 A1* | 2/2010 | Culbertson ........... F03D 7/0204 188/73.31 |
| 2010/0084079 A1 | 4/2010 | Hayden et al. |
| 2010/0124474 A1 | 5/2010 | Jacobsen et al. |
| 2010/0290912 A1 | 11/2010 | Sorensen |
| 2011/0044817 A1 | 2/2011 | Bendel et al. |
| 2012/0207607 A1 | 8/2012 | Mironov |
| 2014/0334934 A1* | 11/2014 | Kannenberg ........... F03D 1/0658 416/217 |

FOREIGN PATENT DOCUMENTS

| | | |
|---|---|---|
| JP | 2003293935 A | 10/2003 |
| WO | WO 03/082551 A1 | 10/2003 |
| WO | WO 2006/070171 A1 | 7/2006 |
| WO | WO 2009/085041 A1 | 7/2009 |
| WO | WO 2010/149806 A1 | 12/2010 |
| WO | WO 2011/035548 A1 | 3/2011 |
| WO | WO 2012/038034 A1 | 3/2012 |

* cited by examiner

ROTOR BLADE ASSEMBLY HAVING A STIFFENING ROOT INSERT

FIELD OF THE INVENTION

The present subject matter relates generally to wind turbines and, more particularly, to a rotor blade assembly having a stiffening root insert.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor. The rotor is coupled to the nacelle and includes a rotatable hub having one or more rotor blades. The rotor blades are connected to the hub by a blade root. The rotor blades capture kinetic energy from wind using known airfoil principles and convert the kinetic energy into mechanical energy through rotational energy to turn a shaft coupling the rotor blades to a gearbox, or if a gearbox is not used, directly to the generator. The generator then converts the mechanical energy to electrical energy that may be deployed to a utility grid.

The particular size of the rotor blades is a significant factor contributing to the overall capacity of the wind turbine. Specifically, increases in the length or span of a rotor blade may generally lead to an overall increase in the energy production of a wind turbine. Accordingly, efforts to increase the size of rotor blades aid in the continuing growth of wind turbine technology and the adoption of wind energy as an alternative and commercially competitive energy source. Such increases in rotor blade size, however, may impose increased loads on various wind turbine components. For example, larger rotor blades may experience increased stresses at the connection between the blade root and the hub, leading to challenging design constraints, both characterized by extreme events and fatigue life requirements.

The likelihood of structural failure due to fatigue at the rotor blade joint is typically increased by the presence of high stress concentration between the load bearing components, manufacturing defects, unexpected loading events, or deterioration of the joint. Loss of preload can also occur in the bolted joint which is known to reduce fatigue life. To endure the load envelope specific to the rotor blade root, various methods and systems have been devised and implemented to improve the connection between the dissimilar materials intrinsic to the rotor components. For example, some systems consist of a blade root having a flange, wherein the flange is bolted to the hub. In other systems, a threaded insert is bonded or infused within the blade root laminate and a bolt (i.e. the load bearing component) is screwed therein. In still additional systems, low-cost, low-density foam is inserted between the bolts and the blade root laminate. Such systems, however, are not directed to a blade root having a T-bolt connection.

Thus, there is a need for a rotor blade assembly having improved stiffness that is directed to a blade root having a T-bolt connection. Accordingly, a rotor blade assembly having a rigid root insert compressed by the T-bolt connection and thereby providing improved blade root stiffness would be advantageous.

BRIEF DESCRIPTION OF THE INVENTION

Aspects and advantages of the invention will be set forth in part in the following description, or may be obvious from the description, or may be learned through practice of the invention.

In accordance with one embodiment of the invention, a rotor blade assembly for a wind turbine having a rigid root insert is disclosed. The rotor blade assembly includes a blade root section having an end face with a substantially annular cross-section defined by an outer sidewall surface and an inner sidewall surface. The end face is configured to attach the rotor blade assembly to a hub. Further, the rotor blade assembly includes a radial bore hole provided at a predetermined span-wise distance from the end face and extending between the sidewall surfaces. Moreover, the assembly includes a longitudinal bore hole provided between the sidewall surfaces and extending from the end face to the radial bore hole so as to form a T-configuration with the radial bore hole.

The rigid root insert may be disposed within the longitudinal bore hole and may extend from the end face to the radial bore hole. As such, the rigid root insert is configured to increase the stiffness of the blade root section when the rotor blade assembly is attached to the hub with bolts that extend into and through the radial bore hole and the longitudinal bore hole.

In further embodiments, the rotor blade assembly includes a cross-bolt component disposed within the radial bore hole, wherein the cross-bolt component comprises an internal female threaded portion. Further, the rotor blade assembly may include a bolt component having a male threaded portion, wherein the bolt component extends into and through the rigid root insert and at least partially through the cross-bolt component such that the male threaded portion engages the female threaded portion so as to form a T-bolt connection. In another embodiment, the bolt component may further include a nut component and a washer component configured to provide a predetermined preload to the bolt component so as to compress the rigid root insert when in an assembled state. In another embodiment, the rotor blade assembly may include a pitch bearing configured between the end face of the blade root section and the hub. As such, the rigid root insert may be compressed between the pitch bearing and the cross-bolt component.

In still additional embodiments, the rotor blade assembly may include a plurality of longitudinal bore holes and a plurality of radial bore holes spaced circumferentially about the blade section. Further, each of the longitudinal bore holes may align with one of the radial bore holes to form a T-configuration.

In further embodiments, the rotor blade assembly may include a plurality of rigid root inserts disposed within the plurality of longitudinal bore holes. Further, a plurality of cross-bolt components may be disposed within the plurality of radial holes and a plurality of bolt component may be disposed within the plurality of rigid root inserts. Moreover, each of the cross-bolt components may include an internal female threaded portion and each bolt component may include a corresponding external male threaded portion. As such, each male threaded portion may engage one of the female threaded portions so as to form a T-bolt connection.

In yet another embodiment, the rigid root insert may include a hollow bore having a smooth inner surface. Further, the rigid root insert may have any cross-sectional shape. For example, the cross-sectional shape may be one of a circle, annular, square, oval, trapezoid, rectangle, triangle, or similar.

In further embodiments, the end face of the blade root section may be generally flush with an end portion of the rigid root insert.

In another aspect of the invention, a method for attaching a rotor blade to a hub of a wind turbine is disclosed. The method includes installing a rigid root insert within a longitudinal bore hole of a blade root section; inserting a cross-bolt component within a radial bore hole of the blade root section; inserting a bolt component within the rigid root insert such that the bolt component engages the cross-bolt component; and, compressing the rigid root insert between a pitch bearing and a cross-bolt component so as to increase the stiffness of the blade root section.

In another embodiment, the method further comprises sizing the longitudinal bore hole to accommodate the rigid root insert and the bolt component. Further, the method may include installing a plurality of cross-bolt components and a plurality of bolt components, wherein at least one of the bolt components is inserted within the rigid root insert. In still another embodiment, the step of compressing the root insert between a pitch bearing and a cross-bolt component includes securing the bolt component with a nut component and a washer component and torqueing the nut component.

In another embodiment, a wind turbine having a tower; a nacelle configured atop the tower; and a rotor having a rotatable hub and at least one rotor blade assembly is disclosed. The at least one rotor blade assembly may be configured in accordance with any of the embodiments discussed above.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
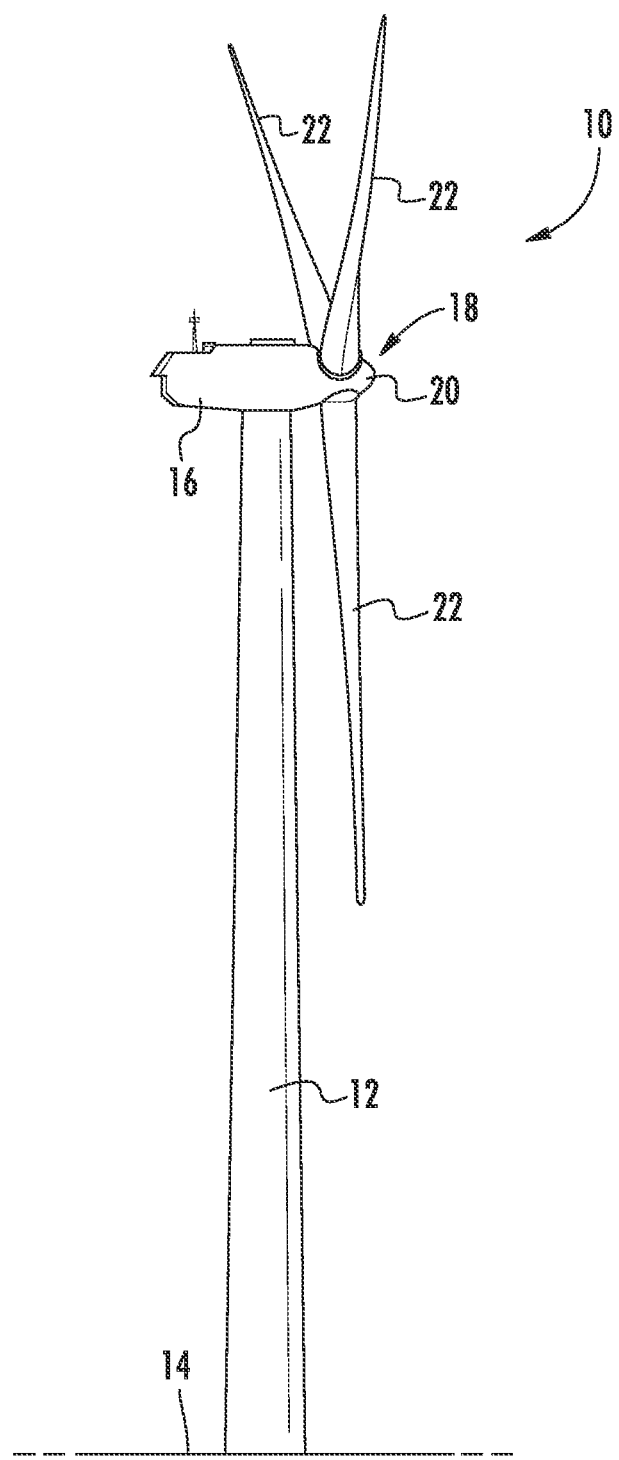
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present invention discloses a rotor blade assembly for a wind turbine having a blade root section with a rigid root insert disposed therein so as to increase stiffness in the blade root section. Further, the rigid root insert may reduce loads experienced by a plurality of bolts connecting the rotor blade assembly to a hub. The rigid root insert is configured between a pitch bearing and a cross-bolt component in the blade root. At least one of the bolts is inserted through the rigid root insert and engages the barrel nut (i.e. the cross-bolt component) so as to form a T-bolt connection. A nut and a washer provide a predetermined preload to the bolt and compress the rigid root insert between the pitch bearing and the barrel nut. Accordingly, the rigid root insert provides improved stiffness in the blade root section and reduces loads acting on the T-bolted joint and the blade root. Thus, improved fatigue life in the blade root and the bolts may be obtained.

Referring to the drawings, FIG. 1 illustrates a perspective view of one embodiment of a wind turbine 10. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to the nacelle 16, which encloses an electric generator (not shown) to permit electrical energy to be produced.

Figure 2:
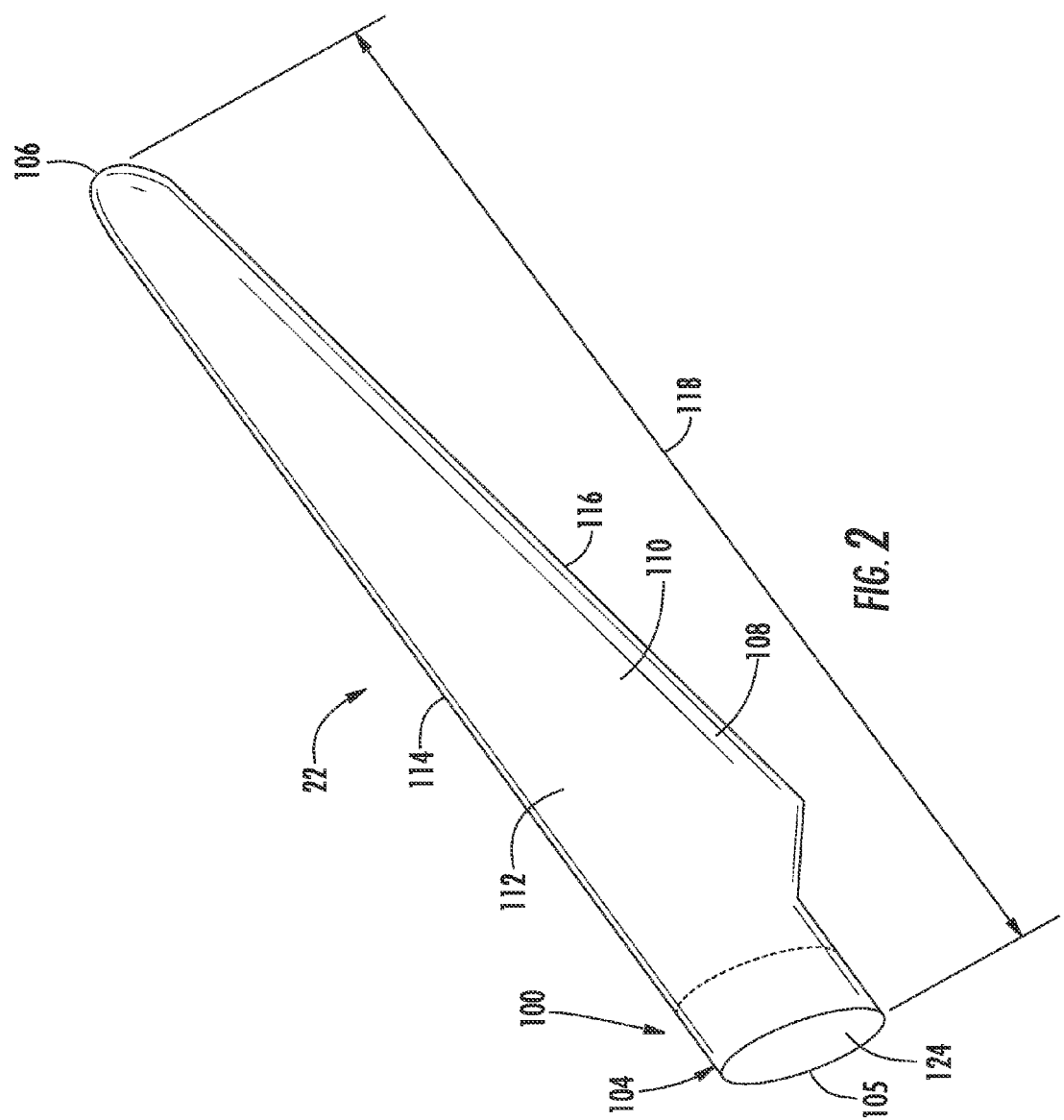
FIG. 2 illustrates a perspective view of one embodiment of a rotor blade assembly of a wind turbine according to the present disclosure.

Referring now to FIG. 2, there is illustrated one embodiment of a rotor blade 22 having a rotor blade assembly 100 in accordance with the present invention. The rotor blade 22 includes a shell 108 defining a pressure side 110 and a suction side 112 between a leading edge 114 and a trailing edge 116. The shell 108 may generally be configured to extend between a blade root 105 and a blade tip 106 disposed opposite the blade root 105 and may serve as the outer casing/covering of inner load bearing structure of the blade. Further, the rotor blade 22 may have a span 118 defining the total length between the blade root 105 and the blade tip 106. The rotor blade assembly 100 may further include a blade root section 104 having a generally cylindrical shape extending span-wise from the pressure side 110 and suction side 112 to an end face 124 of the blade root section 104. The term "span-wise" is generally understood to mean substantially parallel to the span 118 of the rotor blade 22. Further, the end face 124 of the blade root section 104 may be configured to attach the rotor blade 22 to the hub 18 of the wind turbine 10 (FIG. 1).

Figure 3:
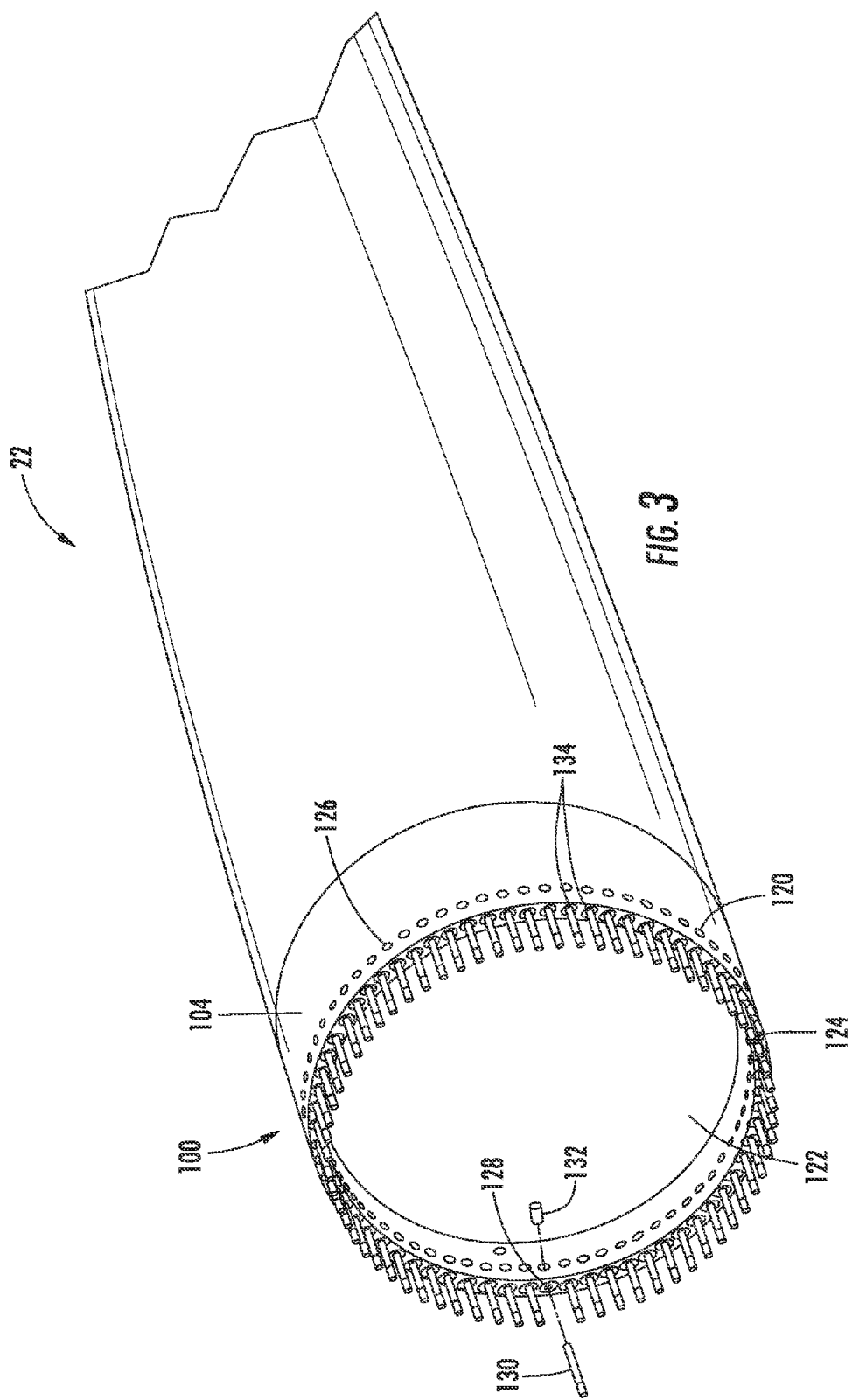
FIG. 3 illustrates an enlarged view of a portion of the rotor blade assembly of FIG. 2 according to the present invention.

Referring now to FIG. 3, an enlarged view of the rotor blade assembly 100 of FIG. 2 is illustrated. In this particular embodiment, the blade root section 104 includes end face 124 and has a substantially annular cross-section defined by an outer sidewall surface 120 and an inner sidewall surface 122. Further, a plurality of radial bore holes 126 are provided circumferentially about the blade root section 104. The radial bore holes 126 are provided a predetermined span-wise distance from the end face 124 and extend between the sidewall surfaces 122, 124. Additionally, a plurality of longitudinal bore holes 128 are provided between the sidewall surfaces 120, 122 and extend from the end face 124 to the radial bore holes 126. A plurality of rigid root inserts 134 are disposed within the longitudinal bore holes 128 substantially a length of the longitudinal bore holes 128 (i.e. from the end face 124 to the radial bore holes 126). A plurality of bolt components 130 are provided through the rigid root inserts 134 and engage the cross-bolt components 132. The bolt components 130 may be a bolt or any suitable connecting device that secures the blade root section 104 to a pitch bearing 106 (not shown) and/or other wind turbine components. Similarly, the cross-bolt components 132 may be any suitable connecting device, such as barrel nut, so as to engage the corresponding bolt component 130.

Figure 4:
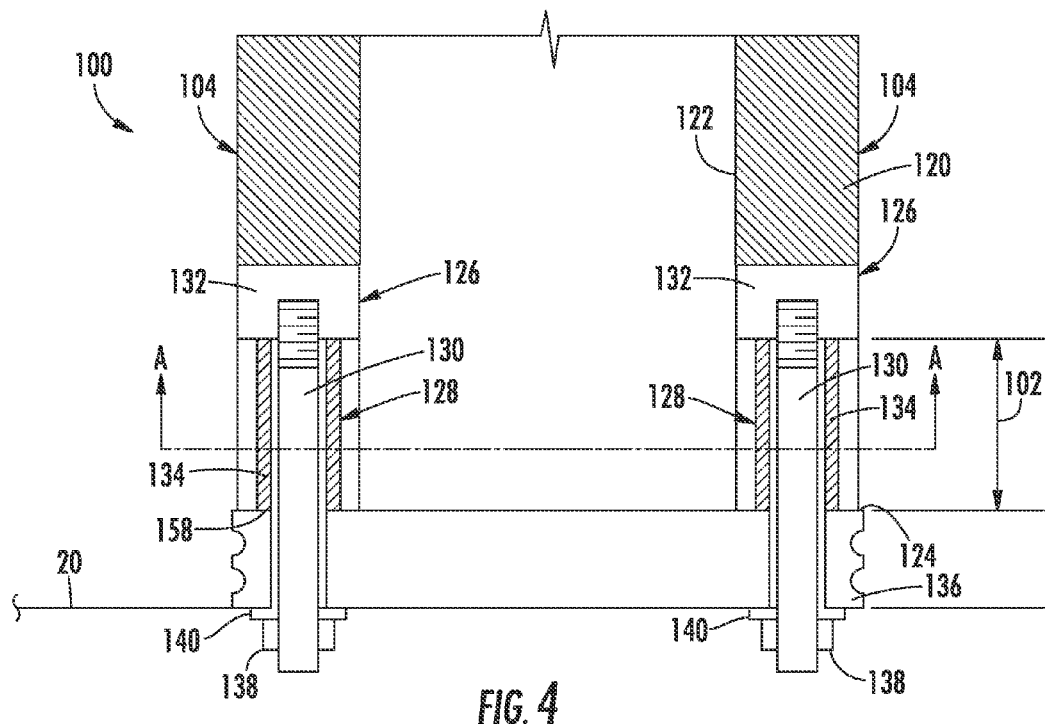
FIG. 4 illustrates a cross-sectional view of a portion of one embodiment of the rotor blade assembly according to the present disclosure.
Figure 5:
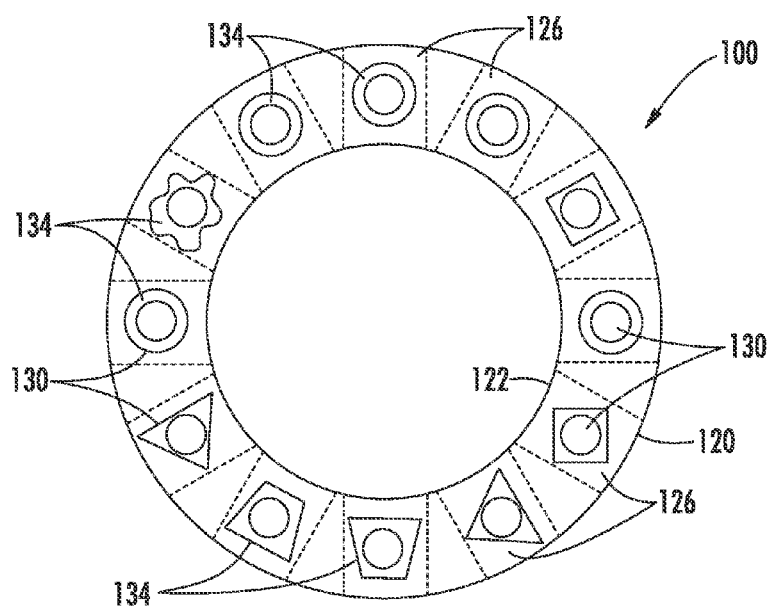
FIG. 5 illustrates a top view along line A-A of the embodiment of FIG. 4 according to the present invention.

Referring now to FIGS. 4 and 5, a cross-sectional view and a top view of the rotor blade assembly 100 according to certain embodiments are illustrated, respectively. As shown in FIG. 4, the rotor blade assembly 100 having blade root section 104 is in an assembled state. More specifically, the blade root section 104 is connected to a hub 20 with a plurality of bolt components 130 through a pitch bearing 106. More specifically, the blade root section 104 includes longitudinal bore holes 128 extending from the end face 124 to the radial bore holes 126. The rigid root inserts 134 are provided within the longitudinal bore holes 128 and extend substantially the length of the longitudinal bore holes 128. The radial bore holes 126 are provided a predetermined span-wise distance 102 from the end face 124 and extend between the sidewall surfaces 120, 122 (as indicated by the dotted lines of FIG. 5). Cross-bolt components 132 are provided within the radial bore holes 126 and bolt components 130 are provided within the rigid root inserts 134. As such, the bolt components 130 engage the cross-bolt components 132 in a T-bolt connection. Further, the bolt components 130 are secured within the blade root section 104 by a nut component 138 and a washer component 140 configured to provide a predetermined preload to the bolt components 130. Additionally, a torque on the nut component 138 compresses the rigid root insert 134 between the pitch bearing 136 and the cross-bolt component 132. It should be understood that although rigid, the rigid root insert 134 may be compressed when under a load (e.g. provided by the nut component 138) to the extent to relieve axial load placed on the sidewalls 120, 122 and/or the bolt components 130. Accordingly, by providing inserts 134 having a length substantial equal to the length of the longitudinal bore holes 128, the rigid root inserts 134 may act to increase the stiffness of the blade root section 104 when the rotor blade assembly is in an assembled state.

Referring now to FIG. 5, a top view of the embodiment shown in FIG. 4 along line A-A is illustrated. As shown, the blade root section 104 includes inner 122 and outer 120 sidewall surfaces, wherein the bolt components 130 are circumferentially spaced (equally or otherwise) between the inner 122 and the outer 120 sidewall surfaces. Further, the rigid root inserts 134 may have any shape. For example, the rigid root inserts 134 may have a cylindrical, cube, oval, trapezoidal, rectangular, triangular, asymmetrical, or similar shape. In further embodiments, the shape of the rigid root insert 134 may taper or transition from one end of the rigid root insert 134 to an opposite end. Similarly, the rigid root inserts 134 may have any suitable and corresponding cross-sectional shape. For example, the rigid root inserts 134 may be a circular, semi-circular, annular, square, oval, trapezoidal, rectangular, triangular, asymmetrical, or any similar shape or any portion thereof. As such, in an assembled state, the rigid root insert 134 may encompass the entire bolt component 130 or may only surround a portion of the bolt component 130.

Figure 6:
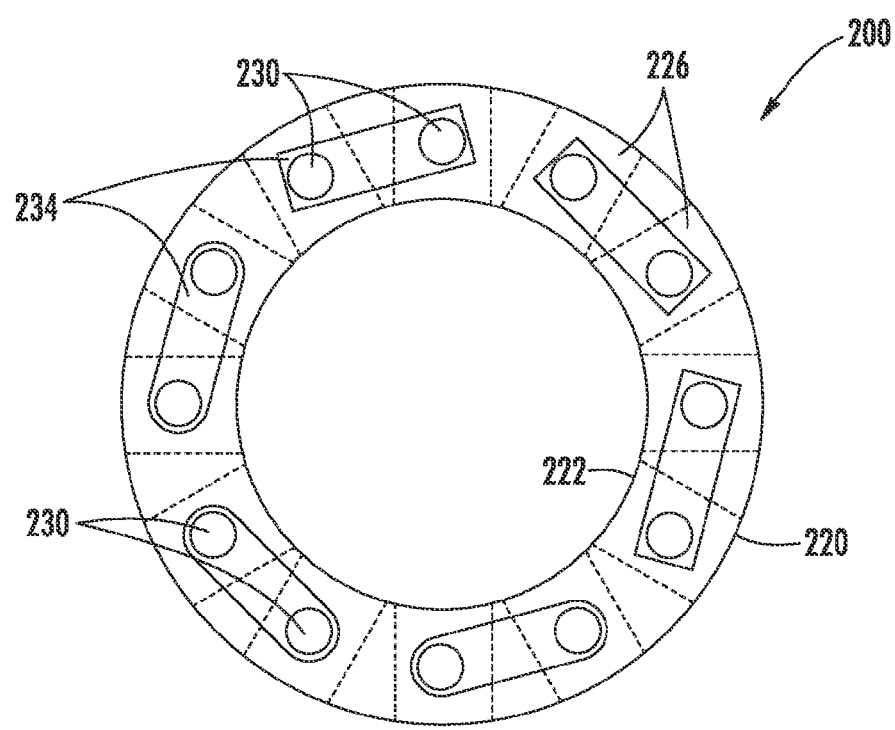
FIG. 6 illustrates individual components of one embodiment of the rotor blade assembly according to the present disclosure.
Figure 7:
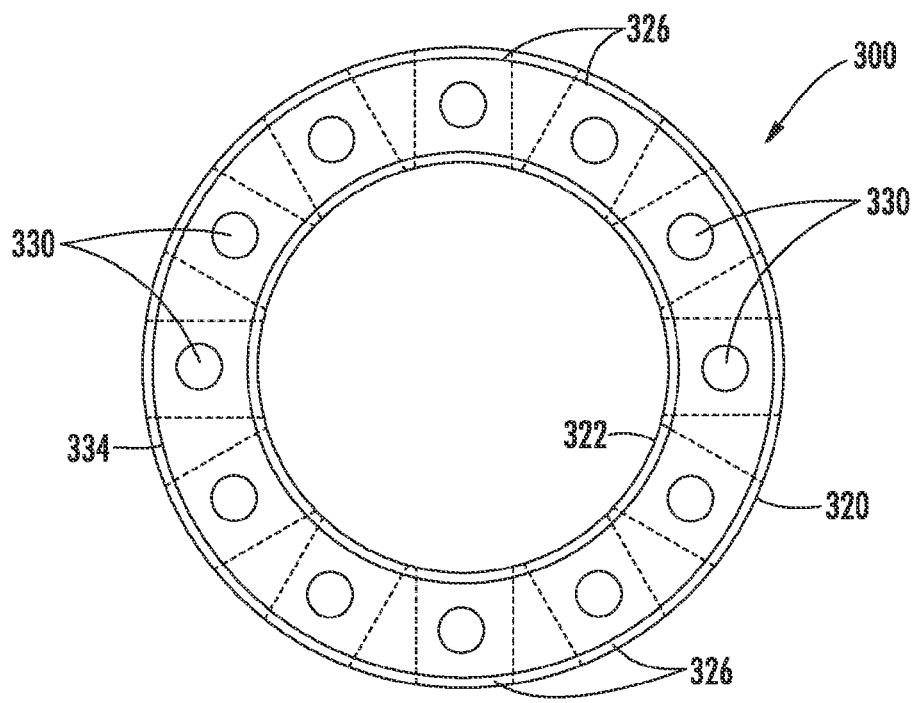
FIG. 7 illustrates the individual components of the embodiment of FIG. 6 in an assembled state.

Additionally, the rigid root inserts 134 may all have the same cross-sectional shape, may have different cross-sectional shapes, or any combination thereof. As illustrated in FIG. 5, for example, the rigid root inserts 134 comprise a plurality of cross-sectional shapes including circular, square, asymmetrical, triangular, and trapezoidal shapes. Further, FIG. 6 illustrates another embodiment of the present disclosure wherein the rigid root inserts 234 have cross-sectional shapes including rectangular and oval shapes. Additionally, FIG. 7 illustrates another embodiment of the rigid root inserts 334 having an annular shape.

The rigid root inserts 134 may also have any suitable side-wall thickness so as to provide desired degrees of stiffness throughout the blade root section. As such, in one embodiment, the rigid root insert 134 may have a shape and/or thickness that allows the insert to fit within a currently-existing longitudinal bore hole. In another embodiment, the rigid root inserts 134 may have a thickness and/or shape that requires retrofitting of the longitudinal bore holes. In still further embodiments, a single bolt component 130 may be disposed within each rigid root insert 134 as shown in FIGS. 4 and 5 or multiple bolt components 130 may be disposed within a single rigid root insert 134. For example, as shown in FIGS. 6 and 7, the rigid root inserts 134 each include multiple bolt components 130 disposed therethrough. More specifically, in FIG. 6, two bolt components 230 are disposed through each rigid root insert 234. Further, in FIG. 7, all of the bolt components 330 are disposed through a single rigid root insert 330 extending circumferentially around the blade root section 104.

Figure 8:
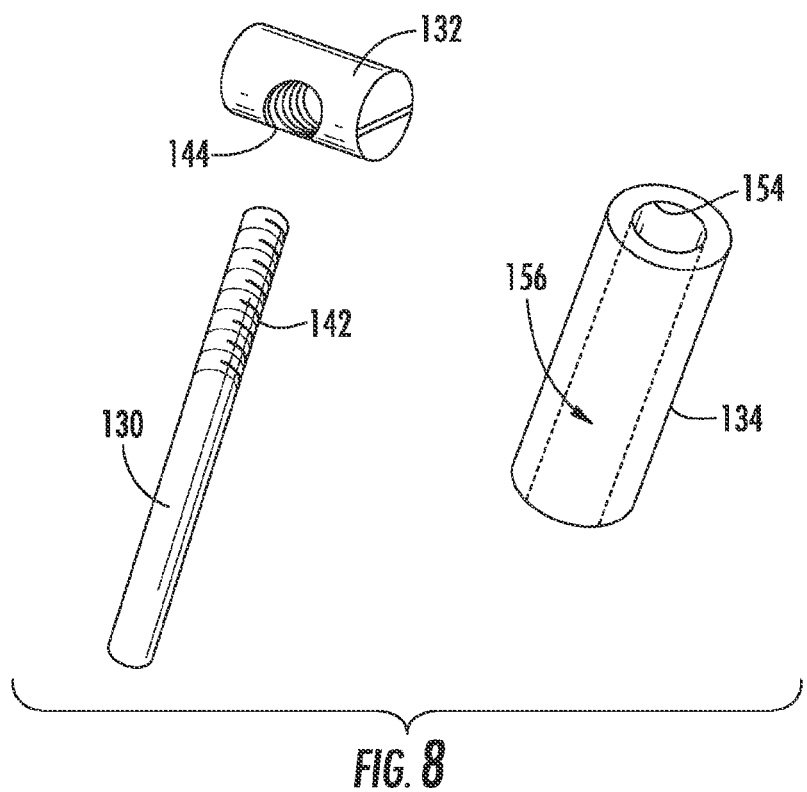
FIG. 8 illustrates a top view of another embodiment of the rotor blade assembly according to the present invention; and, FIG. 9 illustrates a top view of another embodiment of the rotor blade assembly according to the present invention.
Figure 9:
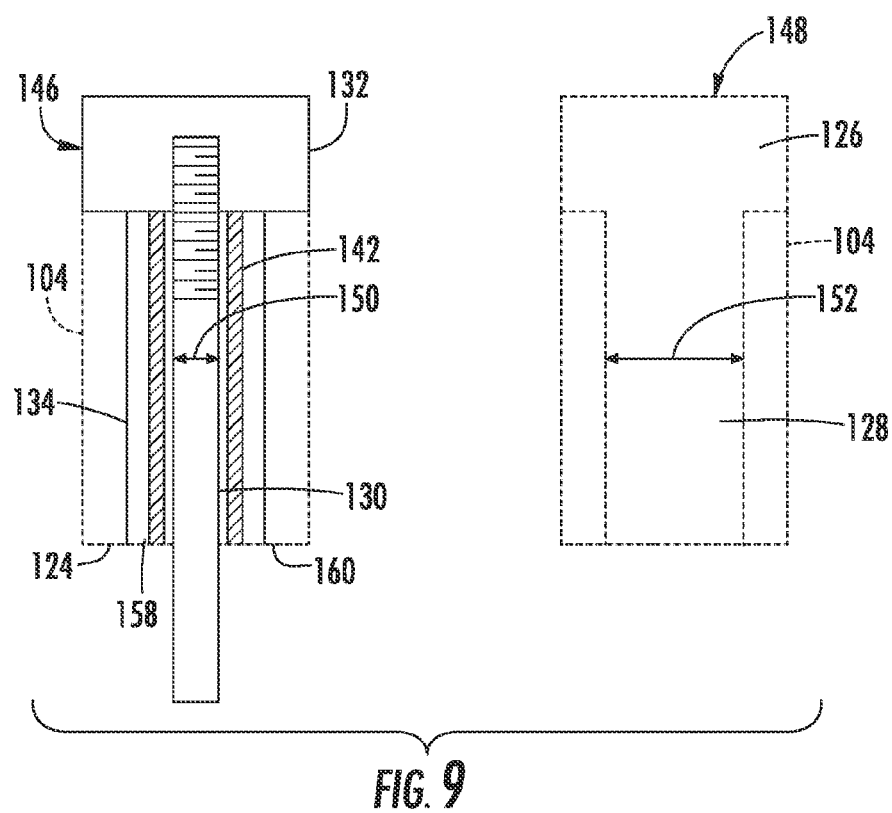

Referring now to FIGS. 8 and 9, the individual components of one embodiment of the rotor blade assembly 100 according to the present disclosure are illustrated. For example, FIG. 8 illustrates a three-dimensional view of the cross-bolt component 132, the bolt component 130, and the rigid root insert 134. As shown, the cross-bolt component 132 includes an internal female threaded portion 144 and the bolt component includes an external male threaded portion 142. The illustrated rigid root insert 134 includes a hollow bore 156 having a smooth inner surface 154 extending therethrough. As such, the bolt component 130 may easily extend through the smooth, hollow bore 156 of the rigid root insert 134 and the cross-bolt component 132 such that the male threaded portion 142 engages the female threaded portion 144. Further, the bolt component 130 may engage the inner surface 154, such as, for example, by a friction fit or by threads. Alternatively, in another embodiment, the bolt component 130 may fit within the rigid root insert 134 such that a tolerance is provided between the two components.

FIG. 9 illustrates the components of FIG. 8 in an assembled state but separate from the blade root section 104 to provide further detail. As shown, the assembled state of the bolt component 130, the cross-bolt component 132, and the rigid root insert 134 provides a T-bolt connection 146. The T-bolt connection 146 corresponds to the T-configuration of the longitudinal bore holes 128 and the radial bore holes 126 of the blade root section 104. Further, the width 152 of the longitudinal bore holes 128 is larger than the width 150 of the bolt component 130 so as to accommodate the rigid root insert 134 and the bolt component 130. Moreover, the rigid root insert 134 may be embedded within the blade root section 104 such that the end face 124 of the blade root section 104 may be generally flush with the end portion 158 of the root insert 134, thereby providing a flush surface 160. Such a configuration provides maximum bonding surface contact area between the blade root section 104 and other wind turbine components, such as a pitch bearing.

In additional embodiments, the rigid root insert 134, 234, 334 may be embedded within one of the longitudinal bore holes 128 such that bolt component 130, 230, 330 may be easily inserted therethrough. For example, the root insert 134, 234, 334 may be bonded, infused, or clamped (i.e. without any bonding) within the blade root section 104.

Additionally, the rigid root insert 134, 234, 334 may be constructed of any suitable material so as to provide sufficient stiffness to the blade root section 104 when in an assembled state (i.e. when the rigid root insert 134, 234, 334 is compressed). For example, the root insert 134, 234, 334 may be a fibrous/composite or metallic material or any combination thereof. The fibrous/composite material may be constructed of carbon fibers, glass fibers, natural fibers, or similar, or any combination thereof. Moreover, the root insert 134, 234, 334 may be constructed of a suitable metal, metal alloy, or any combination thereof.

In another aspect of the invention, a method for attaching a rotor blade to a hub of a wind turbine is disclosed. The method may first include removing a pitch bearing and corresponding rotor blade from a hub of a wind turbine. The method may then include removing one or more bolt components and one or more cross-bolt components from the blade root section. If necessary, the method may include sizing the longitudinal bore hole to accommodate a rigid root insert. Sizing the longitudinal bore hole may include machining the longitudinal bore hole such that the rigid root insert fits within the bore hole. As such, the method may then include installing the rigid root insert within the corresponding longitudinal bore hole. The bolt component may then be inserted within the rigid root insert and the cross-bolt component may be inserted within the radial bore hole such that the bolt component engages the cross-bolt component. The rotor blade and pitch bearing may then be reattached to the hub by the bolt components. Another step may include compressing the rigid root insert between a pitch bearing and a cross-bolt component so as to increase the stiffness of the blade root section.

In further embodiments, the method may include installing any number of rigid root inserts such that all bolt components are inserted within a rigid root insert or only one bolt component is inserted within a rigid root insert. In still another embodiment, the step of compressing the root insert between a pitch bearing and a cross-bolt component includes securing the bolt component with a nut component and a washer component and torqueing the nut component.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly for a wind turbine, comprising:
   a blade root section comprising an end face having a substantially annular cross-section defined by an outer sidewall surface and an inner sidewall surface, the end face configured to attach the rotor blade assembly to a hub;
   a radial bore hole provided at a predetermined span-wise distance from the end face and extending between the sidewall surfaces;
   a cross-bolt component disposed within the radial bore hole;
   a longitudinal bore hole provided between the sidewall surfaces and extending from the end face to the radial bore hole; and,
   a rigid root insert disposed within the longitudinal bore hole and extending from the end face to the cross-bolt component, the rigid root insert being flush with the end face of the blade root section and abutting against the cross-bolt component, wherein the rigid root insert is configured to increase the stiffness of the blade root section when the rotor blade assembly is attached to the hub with bolts that extend into and through the radial bore hole and the longitudinal bore hole.

2. The rotor blade assembly of claim 1, wherein the cross-bolt component comprises an internal female threaded portion.

3. The rotor blade assembly of claim 2, further comprising a bolt component comprising a male threaded portion, wherein the bolt component extends into and through the rigid root insert and at least partially through the cross-bolt component such that the male threaded portion engages the female threaded portion so as to form a T-bolt connection.

4. The rotor blade assembly as in claim 3, wherein the bolt component further comprises a nut component and a washer component configured to provide a predetermined preload to the bolt component so as to compress the rigid root insert when in an assembled state.

5. The rotor blade assembly as in claim 1, wherein the rigid root insert comprises a length substantially equal to a length of the longitudinal bore hole so as to increase the stiffness of the blade root section when the rotor blade assembly is in an assembled state.

6. The rotor blade assembly of claim 4, further comprising a pitch bearing configured between the end face of the blade root section and the hub, Wherein the rigid root insert compresses between the pitch bearing and the cross-bolt component when in an assembled state.

7. The rotor blade assembly of claim 1, further comprising a plurality of longitudinal bore holes and a plurality of radial bore holes, wherein the plurality of longitudinal bore holes and the plurality of radial bore holes are circumferentially-spaced in the blade root section, and wherein each of the longitudinal bore holes aligns with one of the radial bore holes to form a T-configuration.

8. The rotor blade assembly of claim 7, further comprising a plurality of rigid root inserts disposed within the plurality of longitudinal bore holes.

9. The rotor blade assembly of claim 6, further comprising a plurality of cross-bolt components disposed within the plurality of radial holes and a plurality of bolt components disposed within the plurality of rigid root inserts, wherein each cross-bolt component comprises a female threaded portion and each bolt component comprises a male threaded portion, and wherein each male threaded portion engages one of the female threaded portions so as to form a T-bolt connection.

10. The rotor blade assembly of claim 1, wherein the rigid root insert comprises a hollow bore having a smooth inner surface.

11. The rotor blade assembly of claim 1, wherein the rigid root insert comprises a cross-sectional shape, wherein the cross-sectional shape is one of a circle, annular shape, asymmetrical shape, square, oval, trapezoid, rectangle, triangle, or a portion thereof.

12. The rotor blade assembly of claim 1, wherein the end face of the root section is generally flush with an end portion of the rigid root insert.

13. A wind turbine, comprising:
a tower;
a nacelle configured atop the tower; and,
a rotor coupled to the nacelle, the rotor comprising a rotatable hub and at least rotor blade comprising a rotor blade assembly, the rotor blade assembly comprising:
a blade root section comprising an end face having a substantially annular cross-section defined by an outer sidewall surface and an inner sidewall surface, the end face configured to attach the rotor blade assembly to the rotatable hub;
a plurality of radial bore holes provided at a predetermined span-wise distance from the end face and extending between the sidewall surfaces;
a cross-bolt component disposed within each of the plurality of radial bore holes;
a plurality of longitudinal bore holes provided between the sidewall surfaces and extending from the end face to the radial bore hole, wherein each of the longitudinal bore holes aligns with one of the radial bore holes to form a T-configuration; and,
a plurality of rigid root inserts, each rigid root insert disposed within one of the plurality of longitudinal bore holes and extending from the end face to one of the plurality of the cross-bolt components, the plurality of rigid root inserts being flush with the end face of the blade root section and abutting against the cross-bolt components, wherein the plurality of rigid root inserts are configured to increase the stiffness of the blade root section when the rotor blade assembly is attached to the hub with bolts that extend into and through the radial bore hole and the longitudinal bore hole.

14. The wind turbine of claim 13, wherein each of the plurality of cross-bolt components comprise a female threaded portion, the wind turbine further comprising a plurality of bolt components each comprising a male threaded portion, wherein each of the bolt components extends into and through one of the rigid root inserts and at least partially through one of the cross-bolt components such that the male threaded portion engages the female threaded portion so as to form a T-bolt connection.

15. The wind turbine of claim 14, wherein each of the bolt components further comprise a nut component and a washer component configured to provide a predetermined preload to each of the bolt components so as to compress the root inserts when in an assembled state.

16. The wind turbine of claim 15, further comprising a pitch bearing configured between the end face of the blade root section and the hub, wherein the rigid root inserts compresses between the pitch bearing and the cross-bolt components when in an assembled state.

17. A method for attaching a rotor blade to a hub of a wind turbine, the method comprising:
inserting a cross-bolt component within a radial bore hole of the blade root section;
installing a rigid root insert within a longitudinal bore hole of the blade root section such that the rigid root insert is flush an end face of the blade root section and abuts against the cross-bolt component;
inserting a bolt component within the rigid root insert such that the bolt component engages with the cross-bolt component to form a T-bolt connection; and,
compressing the rigid root insert between a pitch bearing and the cross-bolt component within the radial hole so as to increase the stiffness of the blade root section.

18. The method as in claim 17, further comprising sizing the longitudinal bore hole to accommodate the rigid root insert and the bolt component.

19. The method as in claim 17, further comprising installing a plurality of cross-bolt components and a plurality of bolt components, wherein at least one of the bolt components is inserted within the rigid root insert.

20. The method as in claim 17, wherein compressing the rigid root insert between a pitch bearing and the cross-bolt component within the radial hole further comprises securing the bolt component with a nut component and a washer component and torqueing the nut component.

* * * * *